May 31, 1932.  V. BAILEY  1,860,378
TRAP
Filed Nov. 12, 1930  2 Sheets-Sheet 1
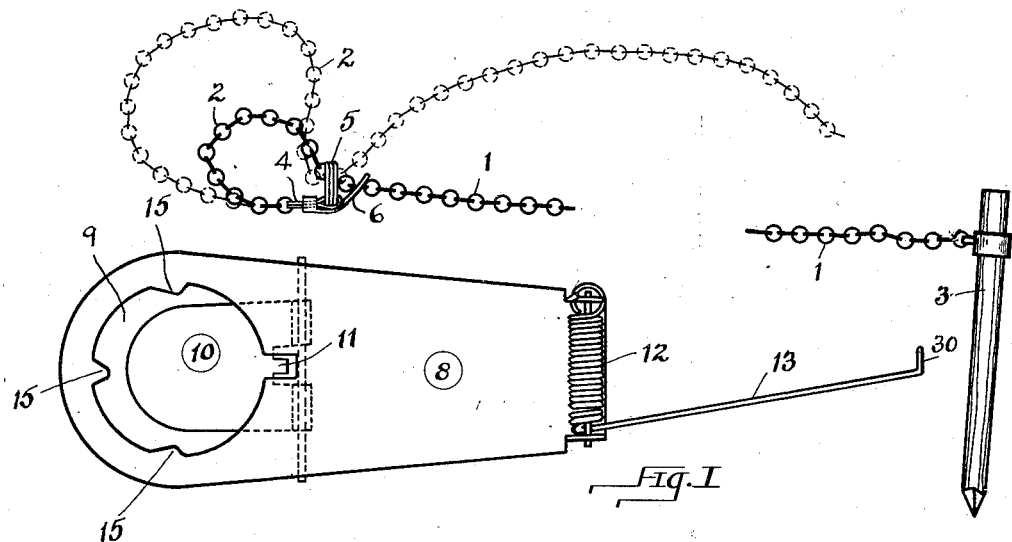
Fig. I
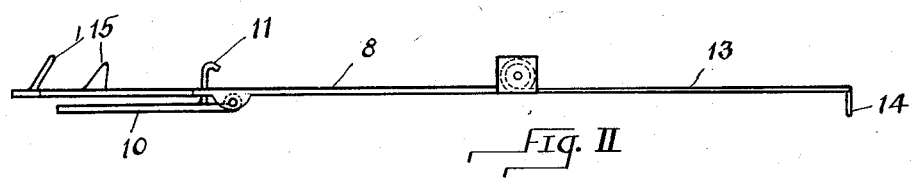
Fig. II
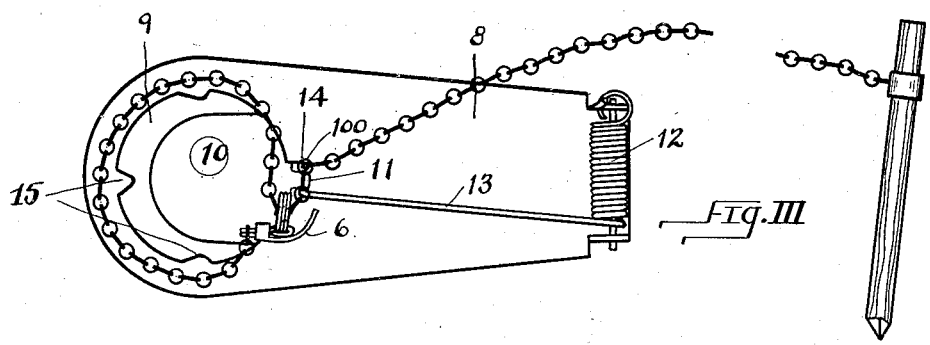
Fig. III
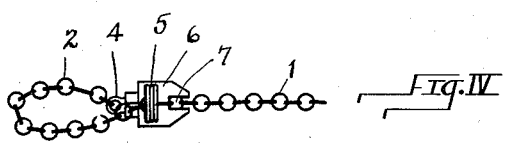
Fig. IV
INVENTOR
Vernon Bailey
by Christy Christy and Wharton
his attorneys

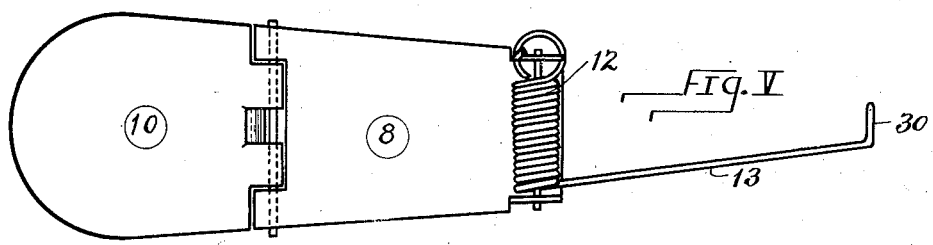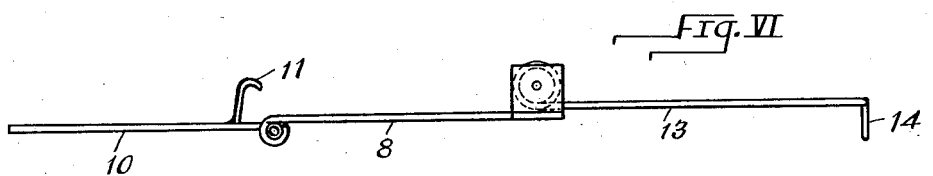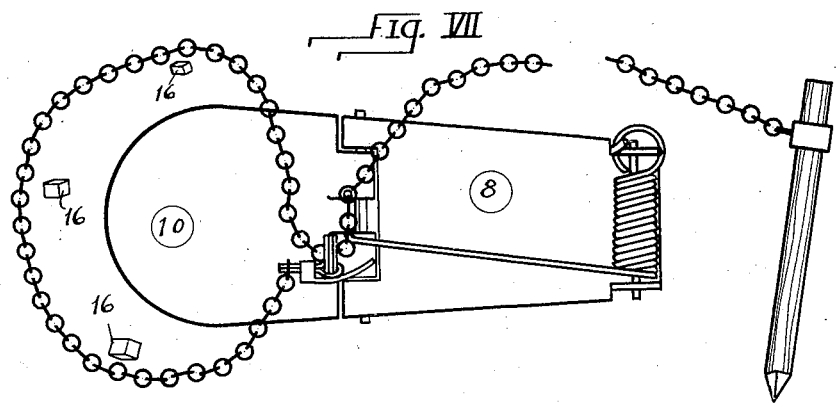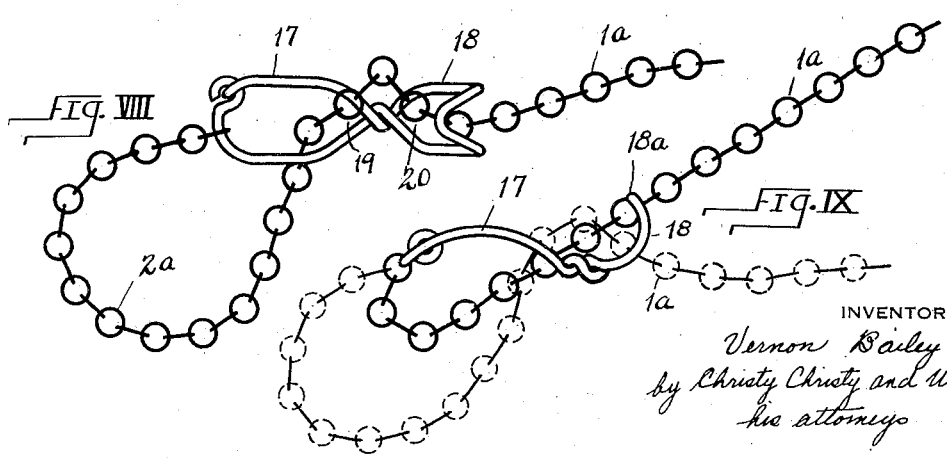

Patented May 31, 1932

1,860,378

UNITED STATES PATENT OFFICE

VERNON BAILEY, OF WASHINGTON, DISTRICT OF COLUMBIA

TRAP

Application filed November 12, 1930. Serial No. 495,081.

My invention relates to improvements in animal traps. The object in view is a trap which will catch and hold the animal securely without mutilation and without inflicting pain, and from which the captured animal will not, leaving a paw in the trap, effect escape. The trap is designed primarily for the capture of larger mammals, such as cats, coyotes, foxes, but is of wider and general applicability.

In the accompanying drawings Fig. I is a view in plan of the component parts of the trap; Fig. II is a view in side elevation of the spring mechanism which constitutes a portion of the trap; Fig. III is a view in plan from above of the trap when set; Fig. IV is a fragmentary view, showing in detail the noose; Figs. V, VI, and VII are views corresponding to Figs. I, II, and III, showing a modification in the spring mechanism of the trap; and Figs. VIII and IX are fragmentary views, to larger scale, showing in detail a certain modification in the structure of the noose.

Referring, first, to Figs. I, II, and III, the trap will be seen to include a noose and a spring mechanism. The noose 2 which in the action of the trap is drawn snug and tight upon the animal's leg is formed of a strand 1 of suitable, strong, flexible material, such that the captured animal may not easily bite or tear it asunder, and I show this noose to be formed, as conveniently it may be formed, of a length of chain. The strand of which the noose is formed is adapted to be secured at its otherwise free end in suitable manner to a clog or stake, and in the drawings I show it secured to a stake 3.

If the strand of which the noose is formed be a length of chain, it may advantageously be provided with a special link 4 which is secured to the end of the strand. The link 4 carries a ring 5 through which the chain returns, so that the noose may be drawn easily and securely to engagement upon the leg of the animal to be captured. The ring 5 may, as indicated in Figs. I and IV, be a coil of wire. There is also associated with the link 4 an outstanding, obliquely turned, pronged plate 6 which does not interfere with the free running of the chain in one direction, to draw the noose snug, but, when the chain hangs slack, engaging an adjacent link, will not allow the noose to loosen.

The noose-forming terminal link of the chain may, alternatively, take the form shown in Figs. VIII and IX. The link there shown is shaped to comprise two adjoining loops 17 and 18. These two loops form substantially a figure 8 in plan, while in side elevation they are reversely curved, as shown in Fig. IX. The loops converge toward their united ends, forming V-shaped crotches 19 and 20. In Fig. IX the noose is shown in taut position in full lines, and in slack position in dotted lines; and it will be perceived that when in taut position, the noose encircling the leg of a captive animal, engagement of one of the normal links of the running chain in the crotch of the terminal link will prevent enlargement of the noose. It will be noted that when the noose has been drawn taut on the leg of an animal tip 18a of the loop 18 will not permit the length of taut chain 1a to swing free of engagement in crotch 19 of the terminal link. Thus it is manifest that the noose, when it has once been drawn taut upon the leg of a captive, will not accidentally slacken to permit escape. When however the noose 2a is free and encircling nothing, the length 1a of chain, released from crotches 19 and 20, may run freely through the terminal link 17 and 18, and the noose may be spread for setting.

The spring mechanism includes a sufficiently powerful spring, here shown as a coiled spring 12, mounted upon a suitable base plate 8, and an arm 13, conveniently formed as a substantially straight prolongation of the length of wire of which the spring itself is formed, which arm is adapted to be held under tension in the set position shown in Fig. III, and when released to swing from such set position through an angular range of 180° (as here exemplified) to the sprung position of Figs. I and II. The proportions are such that the tip of arm 13 in such range of swing travels through a sufficiently wide space, of say a foot or two, and, the trap lying flat on the ground, the tip of the arm shall in its range of swing rise in an arc several inches above the ground.

To the base plate 8 a pan 10 is hinged, and pan 10 is movable across the path in which the arm 13 swings, that the arm may alternately be engaged by and released from engagement with the pan. To this end, the pan is provided with a catch 11 which, engaging a bend 30 in the arm 13, holds the arm under tension, in the set position of Fig. III. When the parts are in set position the pan 10 extends from plate 8 in substantially the same horizontal plane with the plate 8. When an animal, treading on pan 10, swings it downward, the catch 11 passes from engagement with arm 13 and leaves arm 13 free to swing in response to spring tension, from the position shown in Fig. III to that shown in Figs. I and II. In so doing the arm swings in vertical plane through a semi-circular path.

The trap is set by disposing the noose around the pan 10, so that when an animal treads upon the pan his foot will rest within the noose, and by causing the tip of arm 13 to engage the strand of which the noose is formed at a point beyond the ring 5. If the noose be formed of chain, the tip 14 of the wire which constitutes arm 13, projecting upward, may extend as a smooth pin into a link 100 of the chain, loosely engaging the link. When, after the trap has so been set, an animal stepping on pan 10 swings it downward and releases the arm 13, the arm, springing in the manner described, will draw the noose taut upon the leg of the animal. Then, immediately, the noose throwing parts will fall away leaving the animal securely tethered to the stake or other anchorage.

The base plate 8 may be elaborated as Figs. I–III of the drawings show it, extended to surround the pan 10, and provided with upwardly converging wings 15, to hold the noose properly in position, to prevent displacement, and, when the trap is sprung, to guide the noose upwardly to more certain engagement upon the leg of the animal. If the trap is of the less specialized form shown in Figs. V, VI and VII, pegs or pins 16 may be driven into the ground beyond the outer rim of pan 10, to serve the same end as that described of the wings 15 of Figs. I–III. These upwardly converging noose-guiding members are necessary, if the material of which the noose is formed be heavy (and, in practice, it must be heavy), to direct the running noose upwardly when the trap is sprung, and thus to insure engagement at a point well up on the leg of the animal.

In setting the trap care will be taken that beneath the pan a hollow space remains, into which under the tread of the animal the pan may swing.

The trap then is essentially a noose and it includes, associated with the noose, means for throwing the noose upward and drawing it taut upon the leg of an animal at the instant when the animal treads upon the pan.

The trap it will be perceived secures the animal, not by means of spring-backed jaws, but by means of a noose; it does not crush nor mutilate; it secures the animal painlessly; nor will the animal escape, leaving in the trap a severed leg.

I claim as my invention:

1. An animal trap including a noose and means for throwing the noose, the noose being formed of chain, and the noose-throwing means being composed of three parts—a base member, a pan hinged to the base member, and a length of wire, said length of wire being coiled at one end to form a spring and being at such coiled end anchored to the base member at a point remote from the hinge, the said length of wire beyond its coiled end portion constituting a swinging spring-backed noose-throwing arm, and being bent intermediate its length to form a pan-engaging shoulder, and being at its otherwise free end bent aside to form a smooth terminal link-engaging pin.

2. An animal trap including a noose and means for throwing the noose, said noose consisting of a chain whose terminal noose-forming link includes a crotch adapted to engage a link of the chain and by such engagement to prevent the running of the noose, the parts being so proportioned as to bring the said crotch into effective engagement with the links of the noose by the drawing of the noose taut upon the leg of an entrapped animal.

3. An animal trap including a noose and means for throwing the noose, said noose consisting of a chain whose terminal noose-forming link is, in plan, of figure 8 shape with V-shaped crotches at the meeting ends of the loops of the link, and is, in side elevation, of double and reversed curvature, whereby, while still slack, the noose may be drawn taut upon the leg of an animal, and when drawn taut will not slip to release the entrapped animal.

4. An animal trap including a noose and means for throwing the noose, such means consisting of a base-plate, a swinging spring-backed noose-engaging arm mounted upon the base-plate, and a pan hinged to the base-plate and movable across the path in which the said arm swings, the noose being formed of a link of chain and the swinging arm being provided at its outer end with a smooth pin detachably engaging when the trap is sprung a link of the chain.

In testimony whereof I have hereunto set my hand.

VERNON BAILEY.